June 14, 1927.

J. W. GRANTLAND

GAUGE COCK

Filed Oct. 30, 1925

1,632,403

Inventor:
John Walter Grantland

By Wood & Wood
Attorneys

Patented June 14, 1927.

1,632,403

UNITED STATES PATENT OFFICE.

JOHN WALTER GRANTLAND, OF CINCINNATI, OHIO, ASSIGNOR TO THE EDNA BRASS MANUFACTURING COMPANY, OF CINCINNATI, OHIO, A CORPORATION OF OHIO.

GAUGE COCK.

Application filed October 30, 1925. Serial No. 65,853.

This invention relates generally to improvements in valve construction, and is particularly directed to a type of valve used in connection with boiler gauge glasses, and commonly called a gauge cock.

An object of the present invention is to provide a valve wherein renewal of valve seat may be made without requiring the valve body as a whole to be disconnected from the gauge glass, and further to allow the renewal of valve seat to be made while the boiler is under steam.

Another object is to provide a valve comprising two members connected together in co-axial relation by a union coupling member, the valve seat being engaged between the butting ends of the coupling members for producing a steam tight joint, and for forming a valve seat engageable by a translatable valve for controlling fluid discharge from the valve body. This valve seat soon deteriorates or wears and its renewal is frequently necessary. The ordinary valves are so constructed that this renewal cannot be made when the boiler is under steam, except by removing the wheel handle, the packing nut, and withdrawing the bonnet entirely from the stem, and repacking at the packing nut on the stem.

Another object of the invention is to provide a valve stem comprising telescopically engaged sections, one as a valve closing member operable in the body of the valve and adapted to be seated by rotation, in either direction, and the other a main stem member rotatable, but non-translatable, in the bonnet for operating the first section to obtain a seating action of a valve closing member, permitting the hand operable section to be removed while the valve closing member remains seated. By this means the coupling member between the body and bonnet sections can be loosened and the bonnet and hand operable stem section bodily removed.

Another object of the invention is to provide a gauge cock, in which the passages of the bonnet are accessible for inspection without the necessity for removing the stem.

Another object of the invention is to provide a gauge cock having a two-part stem only one of the parts of which travels to open or close the main or repair seat.

Other objects and certain advantages will be more fully set forth in the description of the accompanying drawings forming a part of this specification, in which.

The valve comprises two main sections, a tubular body 1 and a tubular bonnet or head section 2 connected to the body 1 by a union coupling member 3. A valve seat is interposed between the sections and clamped by the said coupling member. The end of the body is suitably flanged and the end of the bonnet is suitably threaded to permit of this coupling connection by the union sleeve 3.

Figure 1:
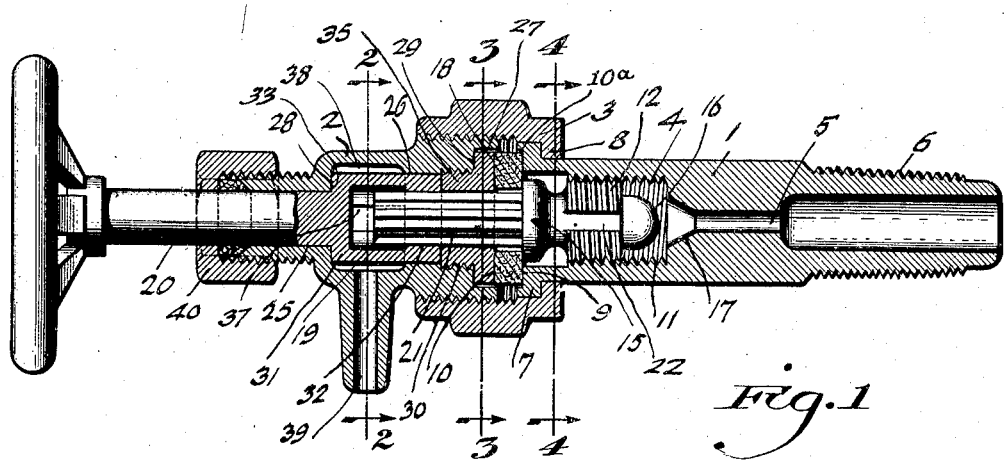
Figure 1 is a longitudinal section through a valve construction in accordance with this invention, showing the discharge control valve closed and the repair inlet valve open.
Figure 2:
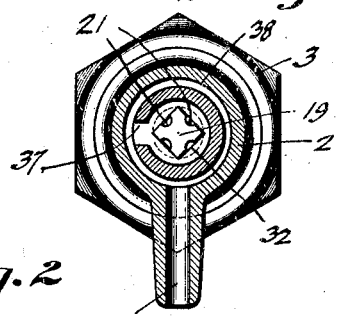
Figure 2 is a cross section on line 2—2 of Fig. 1.
Figure 4:
Figure 4 is a cross section on line 4—4 of Fig. 1.
Figure 3:
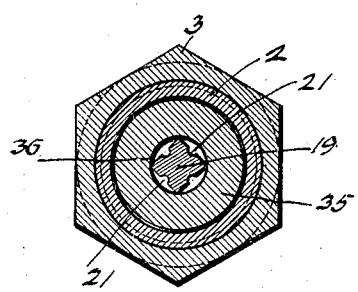
Figure 3 is a cross section on line 3—3 of Fig. 1.

The body 1 is bored and counter-bored longitudinally to provide passages 4, 5, of different diameters. The body is moreover, exteriorly taper threaded at one end as at 6 for attachment to the gauge, or other device upon which it is to be used. The opposite end of the body has an exterior circumferential flange 7 adapted for engagement by a corresponding terminal inner flange 8 of the coupling nut or union 3, and this flange is circularly recessed as at 9 to form a pocket for valve seat 10 interposed between the butting ends of the sections 1 and 2. This ring is the valve seat against which a companion valve closing member seats for controlling the flow from the gauge cock. A short distance inwardly from the flange 7, the enlarged passage is threaded as at 11 for co-action with the corresponding exterior threads 12 of a seat engaging section 15, of a two-part stem comprising telescopically engaged sections. This seat engaging valve section 15 has a double function, that is, it is disposed between and controls inlet and outlet passages respectively according to its direction of translation. The section 15 has a spherical seating end 16, engageable with a conical valve seat 17 formed in the inner end of the small passage 5 of the body 1. The threaded portion of the valve section 16 is of larger diameter and a reduced counter-turned portion 19 is provided, and a shoulder 18 formed which acts to close the opening 10ᵃ of the gasket valve 10. This portion 19 is further machined to make it non-circular in cross section and this non-circular portion is adapted to telescopically engage within an opening 32 of the hand operable portion 20 of the two-part stem, which latter portion is rotatably mounted in the bonnet. This non-circular portion 19 is preferably square cross section and is longitudinally grooved on each face as at 21 to provide steam passages adapted to establish communication between the receiving and discharge passages of the valves. The threaded portion is also longitudinally grooved as at 22 to further provide communication between the passages, when the valve is not seated, as shown in Figure 1.

The head or bonnet section is bored and counter-bored to provide circular bore portions 25, 26, 27, of three different diameters, and also to provide two shoulders 28, 29. The intermediate bore portion 26 is partly threaded as at 30, the threads extending inwardly from the bore portion 27. This portion 26 is adapted to receive the enlarged cylindrical terminal head 31 of the hand operable section 20. The enlarged head 31 provides a broad centering bearing for the stem 20 and further provides a shoulder 33 engaged with the shoulder 28 of the bonnet to prevent stem translation in outward direction. This head portion is provided with a non-circular bore 32 corresponding in cross section to that of the squared portion 19 of the member 15. The hand operable portion of the stem is rotatable in either direction of the bonnet for correspondingly rotating valve section 15 to translate the same to a seating position either against the seat 10 or within the conical seat 17.

A flanged nut or gland 35 is engaged within the bore 26 and with the threads 30 to prevent inward translative motion of the hand operable portion 20. This nut has a circular bore 36 through which the squared part 19 freely passes. The seat 10 engages flatly against the outer face of the nut 35, and the thickness of the head of the nut is less than the depth of the bore portion 27 to form a socket for the seat. Therefore, the seat when in operative position is held in pockets respectively carried by the bonnet and the body 1.

It will be noted that the stem 20 does not project through the seat 10, but only the reduced non-circular portion of the member 15 extends therethrough thus providing a maximum seating area for engagement by the shoulder 18, with the requirement of the minimum of bore area 4 of the body 1.

The seat 10 is of annular configuration and its bore is freely traversed by the non-circular extension of the member 15.

The enlargement 31 of the hand operable portion 20 is slotted as at 37 to provide a passage communicating with an annular passage 38 of the bonnet, which annular passage in turn communicates with an outer passage 39 formed in a radial extension of the bonnet. These latter passages, and passages 4, 5, 19, and 22, form a means of communication between the inlet and outlet ends of the valve.

The bonnet at its outer end has a reduced tubular extension which is exteriorly threaded and a gland nut 40 is engaged over the stem and with these threads to compress packing engaged about the stem 20.

The provision of a stem formed of two parts telescopically engaged permits one of the parts to be seated for closing the valve, and to remain seated while the bonnet and parts carried thereby are bodily removed, to permit of the renewal of the valve seat 10, without requiring the boiler to which the gauge valve is attached to be shut down, or without requiring removal of the valve as a whole.

The construction of the hand operable portion of the stem and its arrangement in the bonnet also permits inspection of the passages 32 and 37 in the bonnet, without removing the stem 20. This inspection can be readily made by disconnecting the coupler 3, after which the bonnet is disengaged from the reduced portion 19 of the valve section exposing the passages 32, 37, and 39, without having to remove the wheel handle or in any way disturbing the packing around the rotatable outer stem.

As shown in Figure 1, the discharge valve is closed and the renewable seat is open. When it is desired to renew the seat 10, the handle is rotated to force the projection 16 into the seat 17. The coupler 3 is then unscrewed whereafter the bonnet section and parts are bodily translated to the left entirely disengaging the head portion of the stem 20 from the valve section 15. The old valve 10 is then removed and a new one substituted, the non-circular opening of the head is then introduced over the reduced portion 19 and the bonnet slid to coupling position, and bonnet and body coupled by the member 3. The member 20 is then rotated in opposite direction to bring the shoulder 18 against the valve seat gasket 10 to prevent valve discharge. When it is desired to open the valve, the member 20 is again turned to separate the shoulder from the seat 10, the translation being sufficient to cause this separation without seating the spherical end 16.

Having described my invention, I claim:

1. A valve, comprising, a valve body having a valve seat therein, a bonnet removably secured to the body, a renewable valve seat disposed between said valve seat and bonnet, a two part valve stem, said parts splined together, one part hand rotatably extending through the bonnet, a nut within the bonnet securing said first stem part against translation, the second valve stem part threaded in the valve body between the renewable valve seat and the valve seat in the body, said second stem part adapted to seat on either valve seat selectively.

2. A valve, comprising, a valve body having a valve seat therein, a bonnet removably secured to the body, a renewable valve seat disposed between said valve seat and bonnet, a two part valve stem one part hand rotatably extending through the bonnet, said part provided with a recess inside of the bonnet, said recess communicating with the bonnet outlet, a nut within the bonnet securing said first stem part against translation, the second valve stem part threaded in the valve body between the renewable valve seat and the valve seat in the body, said part adapted to seat on either valve seat selectively, and a splined connection between the inner end of the first valve stem part and the second valve stem part.

In witness whereof, I hereunto subscribe my name.

JOHN WALTER GRANTLAND.